Patented June 13, 1933

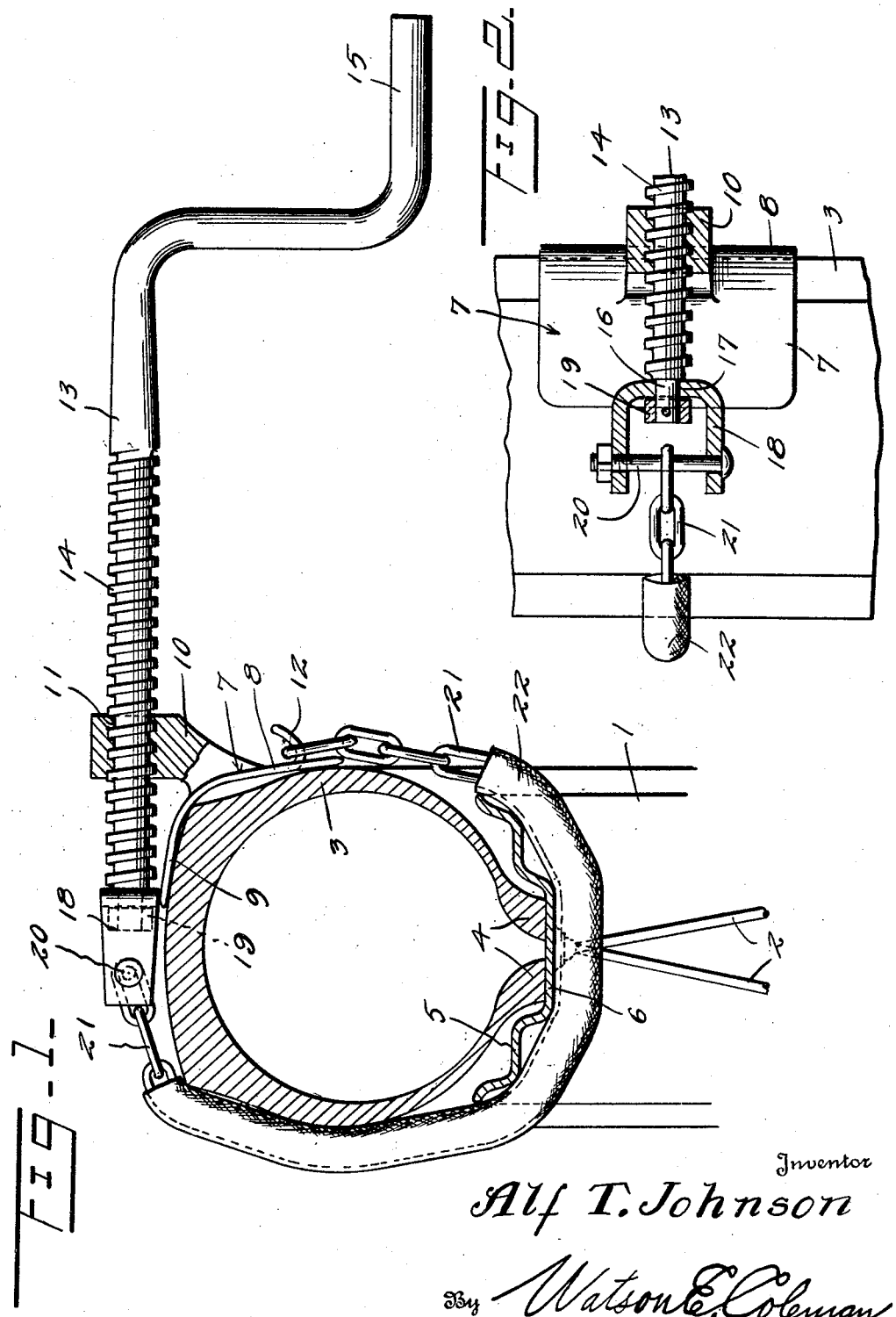

1,913,927

UNITED STATES PATENT OFFICE

ALF T. JOHNSON, OF REVLOC, PENNSYLVANIA

TIRE SQUEEZER OR COMPRESSOR

Application filed August 23, 1932. Serial No. 630,098.

This invention relates to the class of tools and pertains particularly to a tool designed to facilitate the removal of a pneumatic tire casing from the wheel of a motor vehicle.

The primary object of the present invention is to provide a tool by means of which the pneumatic tire casing upon a motor vehicle wheel having a rim of the drop center type, may be readily compressed so that the inner edges thereof will be forced into the drop center of the rim and thereby facilitate the removal of the tire casing therefrom.

Another object of the invention is to provide a tire casing compressor for the purpose described which may be easily and quickly applied to a tire and easily operated to effect the desired compression thereof.

A still further object of the invention is to provide a tool of the character and for the purpose above set forth which may be used upon wheels having disc centers as well as those having wire spokes.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claim.

In the drawing:—

Figure 1 is a view partly in section and partly in elevation of the tool embodying the present invention, showing the same in working position;

Figure 2 is a view in top plan of a portion of the tool, with parts thereof in section.

Referring now more particularly to the drawing wherein like numerals of reference indicate corresponding parts throughout the several views, the numeral 1 indicates generally a drop center type of motor vehicle wheel rim which forms a part of a wire spoke wheel, the spokes being indicated by the numeral 2.

A tire casing such as that indicated by the numeral 3, when in position upon a rim of the character herein illustrated, has its edges 4 located upon the shoulders 5 of the rim and when it is desired to remove the casing, it is desirable that these edges 4 be brought together to drop into the depressed or inset central channel 6 of the rim thereby allowing the opposite side of the casing to move outwardly from the shoulders 5 and thus make it easier to remove the casing from the rim.

The tool embodying the present invention is designed to accomplish the compressing of the tire casing and the forcing inwardly of the edges 4 thereof so that these edges throughout a portion of the circumference of the tire will be forced to position in the central channel 6 of the rim in the manner shown.

This tool comprises a relatively large angular plate which is indicated as a whole by the numeral 7, the portions 8 and 9 of this plate being disposed in obtusely angulated relation as illustrated, the angle being only slightly greater than 90°. Upon the outer side of the plate 7, preferably at the center thereof, there is formed the ear 10 through which a threaded passage 11 is formed. This ear stands away from the plate in such a manner that the axial center of the threaded passage 11 is extended across the side edge of the portion 9. Beneath the ear 10, upon the portion 8, there is located the hook 12, the point of which is turned back or away from the side edge of this portion of the plate upon which it is mounted.

Extending through the aperture of the ear 10 is a shaft 13 having the screw threads 14 which engage the threads within the ear and the outer end of the shaft is formed to provide the crank 15. The other end of the shaft 13 is reduced as indicated at 16, and is extended through an aperture 17 formed through the yoke portion of a substantially U-shaped clevis 18 and a removable head or nut 19 mounted upon the end of the portion 16 of the shaft and within the clevis 18, swivelly retains the clevis upon this end of the shaft.

Connected between the sides or arms of the U-shaped clevis 18 is a bolt 20 which is removable, as shown, and this bolt passes through an end link of a chain 21.

The major portion of the chain 21 is enclosed in a case or sheath 22 which may be formed of any suitable material such as, for example, canvas, rubber or a combination of these two materials.

In the use of the present tool, the plate 7 is disposed against one side of the tire 3 with one of the portions thereof overlying the tread and the other positioned against the side of the tire. The portion overlying the tread must be the portion 9 so that the forward end of the shaft 13 and the clevis 18 will be located over the tire tread. The chain 21 is then passed around the tire and under the rim 1 between the spokes 2 and has one of its links adjacent its other end from the clevis engaged over the hook 12. The chain is drawn as tightly as possible when being placed in this initial position and also the shaft 13 is run forwardly through the ear 10 so that the clevis 18 will be located adjacent the opposite side of the tire from the plate 7. After coupling the chain with the hook 12 in the manner described, the shaft 13 is then rotated in proper manner to draw it back across the tire tread or, in other words, in a manner to move the clevis 18 back toward the ear 10. This will result in a squeezing of the tire and will cause the edges 4 thereof in the immediate vicinity of the tool to be pressed together so that they will at this point drop into the depressed center 6 of the rim thereby making it relatively easy to pull the tire from the rim at the side opposite that to which the tool is applied.

By providing a chain of suitable length, the tool may be effectively employed for facilitating the removal of tires from disc wheels by removing the wheel from the vehicle axle or its support and passing the chain through the opening in the center of the disc.

Having thus described the invention, what is claimed is:—

A tire compressor of the character described comprising an angled plate designed to be located across a tire in a position to engage over one side thereof, a threaded ear carried by said plate, a threaded shaft threaded through said ear and having a crank at one end, an elongated flexible element having one end swivelly attached to the other end of said shaft, and means for detachably coupling the flexible element to the plate after passing the said element about the tire and the supporting rim therefor.

In testimony whereof I hereunto affix my signature.

ALF T. JOHNSON.